United States Patent [19]

Smith

[11] Patent Number: 4,641,625

[45] Date of Patent: Feb. 10, 1987

[54] FUEL CONTROL SYSTEM

[75] Inventor: Peter R. Smith, Nottingham, England

[73] Assignee: Industrial Trade Exchange, Inc., Savage, Minn.

[21] Appl. No.: 725,299

[22] Filed: Apr. 19, 1985

[30] Foreign Application Priority Data

Oct. 10, 1984 [GB] United Kingdom ............... 8425577

[51] Int. Cl.$^4$ .............................................. F02B 13/00
[52] U.S. Cl. ................................. 123/575; 123/304; 123/527; 123/27 GE
[58] Field of Search ........... 123/575, 304, 527, 27 GE

[56] References Cited

U.S. PATENT DOCUMENTS

| 2,612,880 | 10/1952 | Schowalter | 123/27 |
|---|---|---|---|
| 2,708,916 | 5/1955 | Davids | 123/27 |
| 2,929,366 | 3/1960 | Kotlin et al. | 123/27 |
| 2,940,435 | 6/1960 | Nemec et al. | 123/139 |
| 3,016,886 | 1/1962 | Benz et al. | 123/27 |
| 3,406,666 | 10/1968 | Steiger | 123/27 |
| 3,443,551 | 5/1968 | Laubach | 123/27 |
| 3,540,419 | 11/1969 | Fox | 123/27 |
| 3,665,905 | 5/1972 | Brille | 123/119 |
| 4,227,497 | 10/1980 | Mathieson | 123/575 |
| 4,266,274 | 5/1981 | Barman | 364/431 |
| 4,278,064 | 7/1981 | Regueiro | 123/577 |
| 4,300,517 | 11/1981 | Astansky et al. | 123/575 |
| 4,391,253 | 7/1983 | Ito | 123/478 |
| 4,416,224 | 11/1983 | McDonald | 123/577 |
| 4,440,137 | 4/1984 | Lagano et al. | 123/525 |
| 4,452,217 | 6/1984 | Kawamura et al. | 125/571 |
| 4,463,734 | 8/1984 | Akeroyd | 123/525 |
| 4,463,735 | 8/1984 | Stoltman | 123/525 |
| 4,466,416 | 8/1984 | Kawamura | 123/571 |
| 4,476,827 | 10/1984 | Basaglia et al. | 123/276 |
| 4,478,185 | 10/1984 | Obayashi et al. | 123/49 |
| 4,495,930 | 1/1985 | Nakajima | 123/575 |

FOREIGN PATENT DOCUMENTS

| 8130334 | 7/1981 | European Pat. Off. . |
|---|---|---|
| 82850144 | 6/1982 | European Pat. Off. . |
| 83201183 | 8/1983 | European Pat. Off. . |
| 83306605 | 10/1983 | European Pat. Off. . |
| 1114610 | 12/1965 | United Kingdom . |
| 1256574 | 8/1969 | United Kingdom . |
| 1370619 | 12/1970 | United Kingdom . |
| 1325822 | 3/1972 | United Kingdom . |
| 1275387 | 4/1972 | United Kingdom . |
| 1395969 | 11/1972 | United Kingdom . |
| 1545927 | 6/1975 | United Kingdom . |
| 2058211A | 9/1979 | United Kingdom . |
| 2087974A | 10/1980 | United Kingdom . |
| 2080417 | 2/1982 | United Kingdom . |
| 2126650A | 8/1982 | United Kingdom . |
| 1415252 | 1/1983 | United Kingdom . |
| 2112457 | 7/1983 | United Kingdom . |
| 2122681 | 1/1984 | United Kingdom . |
| 81/00618 | 5/1981 | World Int. Prop. O. . |
| 81/01692 | 12/1981 | World Int. Prop. O. . |
| 83/00039 | 10/1983 | World Int. Prop. O. . |

Primary Examiner—E. Rollins Cross
Attorney, Agent, or Firm—Leo Gregory

[57] ABSTRACT

A fuel control system for an internal combustion engine fuelled by a gaseous fuel and a liquid fuel, comprises liquid fuel flow rate control means, and gaseous fuel flow rate control means. The liquid fuel and gaseous fuel flow rate control means are adapted to control the relative proportions of each fuel supplied to the engine, and permit the relative proportion of liquid fuel to be varied in the range having an upper limit of substantially 100%. The gaseous fuel flow rate control means includes gaseous fuel flow rate determination means which is responsive to engine variables, such as engine speed and throttle position to determine from said variables a desired gaseous fuel flow rate. The gaseous fuel flow rate determination means is adapted to generate a signal indicative of said desired gaseous fuel flow rate. This signal can be used to actuate a valve controlling the gaseous fuel flow rate.

18 Claims, 4 Drawing Figures

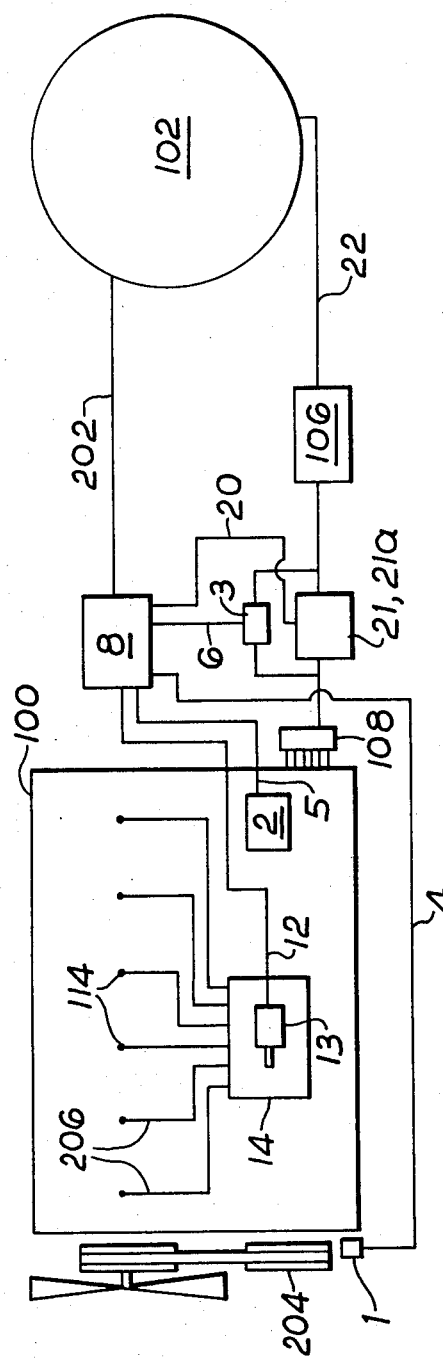
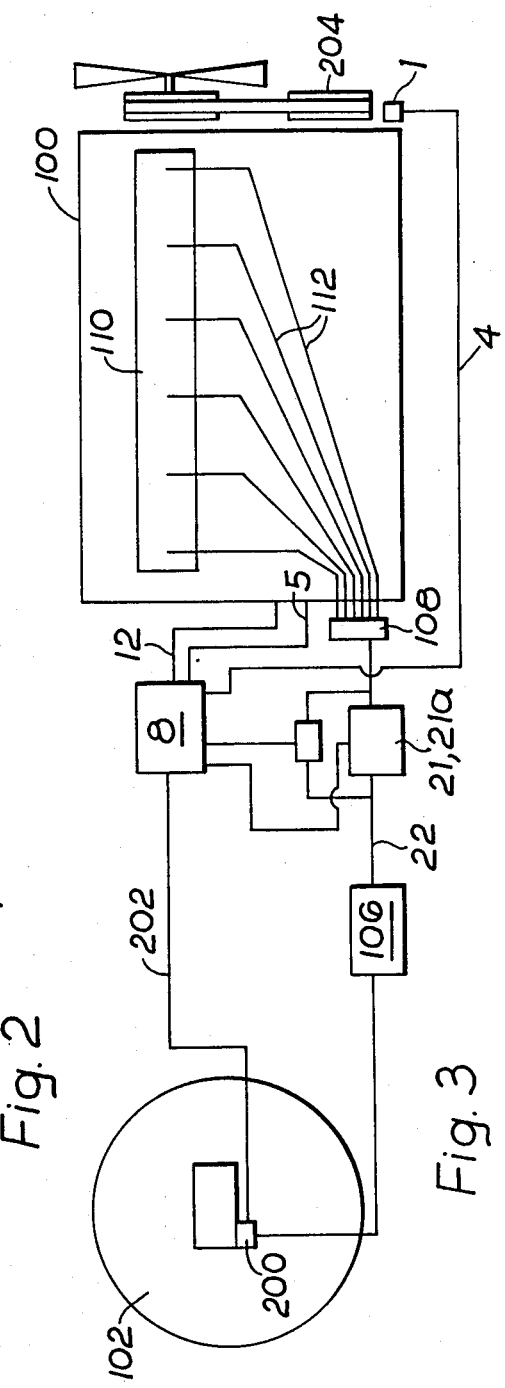
Fig. 2
Fig. 3

FUEL CONTROL SYSTEM

BACKGROUND OF THE INVENTION

This invention relates to a fuel control system, and more particularly relates to a fuel control system for an internal combustion engine fuelled by a gaseous and a liquid fuel.

It is known to provide engines which operate using both a liquid and a gaseous fuel such as diesel and methane or propane; such engines are often termed "dual fuel engines".

Existing dual fuel engines are often operated on diesel only for part of the operating range of the engine and on a mixture of diesel and gaseous fuel for the rest of the operating range. In many cases the gaseous fuel flow rate is subject to very little control. Sometimes the gaseous fuel flow rate is controlled by air intake rate to the engine. In other engines a governor for the liquid fuel is used in an attempt to control the gaseous fuel flow rate.

The arrangements have never been completely satisfactory because they do not permit the control of the gaseous fuel flow rate in a way which permits optimisation of the engine performance.

SUMMARY OF THE INVENTION

According to the present invention there is provided a fuel control system for an internal combustion engine fuelled by a gaseous fuel and a liquid fuel, comprising liquid fuel flow rate control means, and gaseous fuel flow rate control means, said liquid fuel and gaseous fuel flow rate control means being adapted to control the relative proportions of each fuel supplied to the engine, and permitting the relative proportion of liquid fuel to be varied in a range having an upper limit of substantially 100%.

Advantageously said gaseous fuel flow rate control means includes gaseous fuel flow rate determination means responsive to engine variables to determine from said variables the desired gaseous fuel flow rate, and being adapted to generate a signal indicative of said desired gaseous fuel flow rate.

The relative proportion of gaseous fuel may preferably be varied in the range of zero percent to about 95 percent.

Preferably the gaseous fuel flow rate control means includes valve means actuatable to vary the gaseous fuel flow rate, said valve means being actuated in response to the signal generated by the gaseous fuel flow rate determination means.

A transducer responsive to pressure difference across the valve means may be provided which is adapted to generate a signal indicative of the pressure difference. The gaseous fuel flow rate determination means may include first storage means for storing information relating the pressure difference across the valve means, the desired gaseous fuel flow rate, and the magnitude of the signal required by the valve means to provide the desired gaseous fuel flow rate. The gaseous fuel flow rate determination means may first determine the desired gaseous fuel flow rate and then use the first storage means to derive the signal indicative of gaseous fuel flow rate which is then fed to the valve means.

The gaseous fuel flow rate determination means is preferably a microprocessor.

A transducer responsive to engine speed may be provided for generating a signal indicative of engine speed.

In addition, a transducer responsive to throttle position may be provided for generating a signal indicative of the throttle position, and a transducer responsive to the position of a diesel fuel flow rate governor may be provided for generating a signal indicative of said position.

The liquid fuel flow rate control means may include injection pump control means for controlling the flow rate of liquid fuel injected to the engine by injection pumps.

An on/off switch may be provided for switching between two states of engine operation. In one state the engine may operate on liquid fuel only, and in the other state the engine may operate on liquid fuel and gaseous fuel.

In one embodiment the injection pump control means comprises stop means for preventing the injection pumps from injecting more than a predetermined percentage of the liquid fuel which would be injected at full throttle. The stop means may be actuated by a solenoid.

In this embodiment the gaseous fuel flow rate determination means may include a control algorithm adapted to determine the desired gaseous fuel flow rate. The control algorithm may operate such that when the signal indicative of throttle demand is greater than the signal indicative of engine speed the gaseous fuel flow rate is determined in proportion to the engine speed. When the signal indicative of throttle demand is less than or equal to the signal indicative of engine speed the difference between the two may be used an error signal for a proportional and derivative control loop calculation to determine the gaseous fuel flow rate.

This embodiment is especially suitable for internal combustion engines being used with road vehicles.

In an alternative embodiment the injection pump control means may comprise injection pump actuation means operatively linked to the injection pumps.

In this embodiment the liquid fuel flow rate control means may include liquid fuel flow rate determination means responsive to at least one engine variable to determine from said variable the desired liquid fuel flow rate, and adapted to generate a signal indicative of said desired liquid fuel flow rate.

The gaseous fuel flow rate determination means and the liquid fuel flow rate determination means may include a control algorithm adapted to determine the desired liquid and gaseous fuel flow rates.

Second storage means may be provided containing information relating engine speed, the desired liquid fuel flow rate and the magnitude of signal required by the injection pump actuation means to produce the desired liquid fuel flow rate. Given any particular engine speed the control algorithm can derive from the second storage means the signal indicative of liquid fuel flow rate, which is fed to the injection pump actuation means.

Furthermore, third storage means containing information relating position of a liquid fuel governor to a desired gaseous fuel flow rate may also be provided. The control algorithm is able to determine the desired gaseous fuel flow rate given the position of the liquid fuel governor using the third storage means. The position of the liquid fuel governor may be influenced by a number of variables such as throttle position, engine-speed, exhaust gas temperature and engine wheel slip.

The first, second and third storage means may comprise a programmable read only memory. The information stored may be empirical data concerning the optimum fuel flow rate for particular engine conditions.

The fuel control system according to the present invention permits optimisation of the amount of gaseous fuel supplied to the engine.

BRIEF DESCRIPTION OF THE DRAWINGS

Reference is now made to the accompanying drawings, in which:

FIG. 2 is a schematic view of the fuel control system shown in FIG. 1 applied to an engine;

FIG. 3 is a further schematic view of the fuel control system shown in FIG. 1 applied to an engine.

DESCRIPTION OF THE PREFERRED EMBODIMENTS

Figure 1:
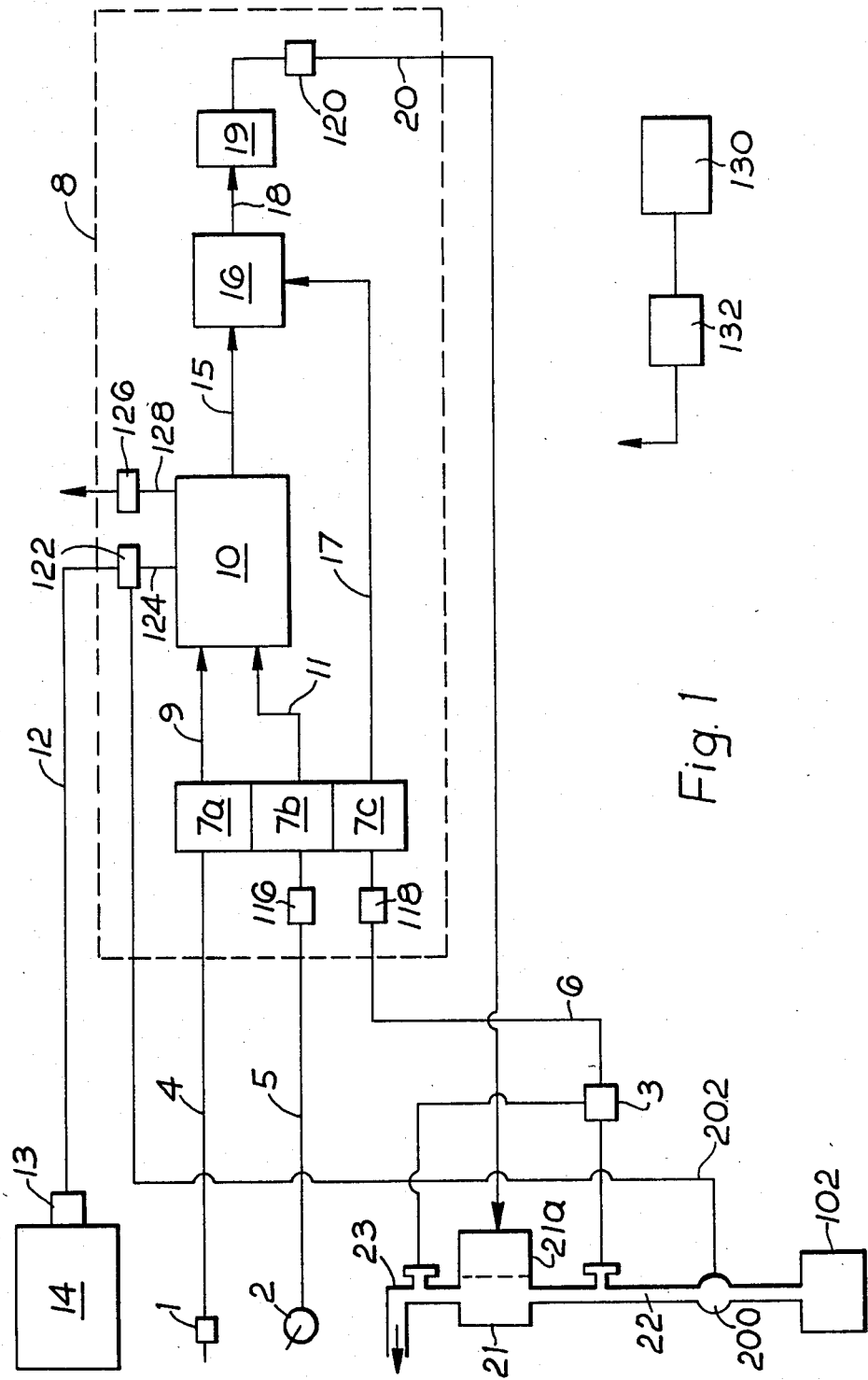
FIG. 1 is a schematic view of one embodiment of a fuel control system according to the invention.

The fuel control system shown in FIG. 1 is particularly suitable for engines used on road vehicles. It includes a speed transducer 1, a throttle demand transducer 2 and a gaseous fuel pressure difference transducer 3. The speed transducer 1, the throttle transducer 2 and the pressure difference transducer 3 are connected to gas and liquid fuel flow rate control means in the form of a microprocessor-based controller 8 (shown in dotted lines) via lines 4, 5 and 6 respectively.

The line 4 is connected to an input filter 7a, and the input filter 7a is connected to a control algorithm 10 of the microprocessor 8 by a line 9. The line 5 is connected to an input filter 7b, and the input filter 7b is connected to the control algorithm 10 of the microprocessor 8 by a line 11. The line 6 is connected to an input filter 7c and the input filter 7c is is connected to first storage means in the form of a look-up table 16 by a line 17.

The control algorithm 10 is connected to a solenoid driver circuit 122 via a line 124. The solenoid driver circuit 122 is connected to a stop means in the form of an electromechanical device 13 via a line 12. In addition the solenoid driver circuit 122 is connected to a solenoid valve 200 in a gas fuel pipe 22, via a line 202.

The electromechanical device 13 is connected to a diesel injection pump 14 on an engine 100 (see FIGS. 2 and 3). The electromechanical device 13 may comprise an air ram (for example the ENOTS type 60052100015) actuated by a solenoid (such as the WEBBER type 3363416/12 volts DC).

The electromechanical device 13 could instead be connected to an engine speed governor (not shown) which controls the injection pump 14. This engine speed governor may be a conventional governor which determines the amount of fuel which should be supplied to the cylinder through the injection pump 14. The fuel requirement determined by the governor would be the amount required if the engine was being operated on diesel fuel only. This governor may for example be the Bosch RQV governor. In addition, the injection pump 14 may be the Bosch PES type injector pump.

The control algorithm 10 is connected to the look-up table 16 via a line 15, and the look-up table 16 is connected to an output filter 19 via a line 18. The control algorithm 10 and look-up table 16 form gaseous fuel flow rate determination means.

The input filters 7a, 7b, 7c and the output filter 19 are both low pass filters which serve to remove any transient noise present and to increase the resolution.

The output filter 19 is connected via line 20 to valve means in the form of a gaseous fuel valve actuator 21a and a gaseous fuel flow rate control valve 21. The gaseous fuel valve actuator 21a serves to actuate the gaseous fuel flow rate control valve 21 in order to regulate the flow rate of gaseous fuel along the gaseous fuel pipe 22. The gaseous fuel valve actuator 21a may be a Heinzmann Elp rotary actuator with closed loop feedback control electronics, and the gaseous fuel flow rate control valve 21 may be a modified rotary LPG gas valve.

Analogue to digital converters 116 and 118 are provided in the lines 5 and 6 respectively in order to convert the analogue signal generated by the transducers 2 and 3 to a digital signal. This is not required in the line 4 because the speed transducer 1 generates pulses representative of the engine speed. A digital to analogue converter 120 is provided in the line 20 to convert the digital output signal of the look-up table 16 into an analogue signal. Amplifiers (not shown) to effect signal conditioning may also be provided in the lines 4, 5, 6 and 20.

The control algorithm 10 is connected to a lamp driver circuit 126 via line 128. The lamp driver circuit may be connected to and operate plurality of lamps (not shown) provided on a control panel (not shown).

The fuel control system may be powered through a vehicle battery 130 via a power supply circuit 132.

FIGS. 2 and 3 show the fuel control system of FIG. 1 on the engine 100, and like parts have been designated with like reference numerals. The throttle transducer 2, which can be a Lucas type 73169A throttle transducer, and the speed transducer 1, which may be a Lucas type 4CS passive induction pickup, are both mounted to the engine 100. The speed transducer 1 is mounted to the engine 100 adjacent a fly wheel 204.

A gaseous fuel supply tank 102 is provided with a solenoid valve 200 which is actuatable by the solenoid driver circuit 122 to permit the flow of gaseous fuel along the gaseous fuel supply pipe 22. A heat exchanger 160 is provided in the supply pipe 22 to exchange heat with cooling fluid in an engine cooling system (not shown). The supply pipe 22 is connected to a gas distributor 108 which is connected to a gaseous fuel inlet 110 for each engine cylinder (not shown) by pipes 112. The gaseous fuel inlets 110 may also serve as air inlets for each cylinder.

The injection pump 14 is connected to the diesel fuel inlets 114 for each engine cylinder via pipes 206.

The operation of the fuel control system shown in FIGS. 1 to 3 is as follows.

The speed transducer 1 generates a digital signal representative of the engine speed which is transmitted via line 4 to the filter 7a. The filter 7a filters the signal from where it is transmitted via line 9 to the control algorithm 10.

The throttle transducer 2 generates an analogue signal representative of the throttle position which is transmitted via line 5 and converted into a digital signal by analogue to digital converter 116. The signal is transmitted to the filter 7b along line 5, and the filter 7b filters the signal and transmits it along the line 11 to the control algorithm 10.

The pressure difference transducer 3 generates an analogue signal indicative of the difference in gaseous fuel pressure across the valve 21, which is transmitted via line 6 and is converted to a digital signal by analogue to digital converter 118. The signal is transmitted from the analogue to digital converter 118 to the filter 7c, and the filter 7c filters the signal and transmits it via line 17 to the look-up table 16.

The operation of the control algorithm 10 is as follows.

When the engine is started the program variables are initialised. The microprocessor-based controller 8 is provided with a watchdog circuit which is regularly pulsed during operation of the engine. In addition, when the engine is started the control algorithm 10 signals the solenoid driver circuit 122 on line 124 which causes the solenoid driver circuit 124 to transmit a signal via line 202 to open the valve 200.

The control algorithm 10 compares the throttle demand signal on line 11 with the engine speed signal on line 9 and determines whether the throttle demand is greater than the engine speed. If it is greater then the desired gaseous fuel flow rate is calculated as a function of the engine speed so that the desired gaseous fuel flow rate is proportional to the engine speed. The desired gaseous fuel flow rate is transmitted along line 15 to the look-up table 16.

If the throttle demand is not greater than the engine speed then the difference between the engine speed and the throttle demand is used as an error signal for a proportional and derivative control loop calculation to produce the desired gaseous fuel flow rate. The desired gaseous fuel flow rate is fed along line 15 to the look-up table 16.

The control algorithm 10 operates such that the value of the calculated flow rate is compared with the maximum allowable flow rate for the particular engine speed (which is known for any particular engine and engine speed) and if the calculated flow rate is greater than this maximum value, then the value of the calculated flow rate is replaced with the maximum value.

The look-up table 16 contains information concerning opening of the valve 21 as a function of the desired gaseous fuel flow rate and of the pressure difference across the valve 21. The look-up table 16 is used to determine the signal representative of the desired gaseous fuel flow rate using the signal on line 15 and the signal on line 17. This determined signal is transmitted via line 18 to the filter 19. It is then fed along line 20 through the digital to analogue converter to the gas valve actuator 21a which actuates the valve 21 thereby controlling the gaseous flow rate.

The control algorithm 10 also produces pulses to actuate the electromechanical device 13 via the solenoid driver circuit 122, and to actuate lamp driver circuit 126.

Typically the control algorithm 10 operates such that the electromechanical device 13 prevents the injection pump 14 from delivering more than a fixed percentage of the liquid fuel which would be supplied at full throttle. An example of a typical fixed percentage is 10%. The device 13 does not prevent the pump 14 from delivering less than the fixed percentage.

Figure 4:
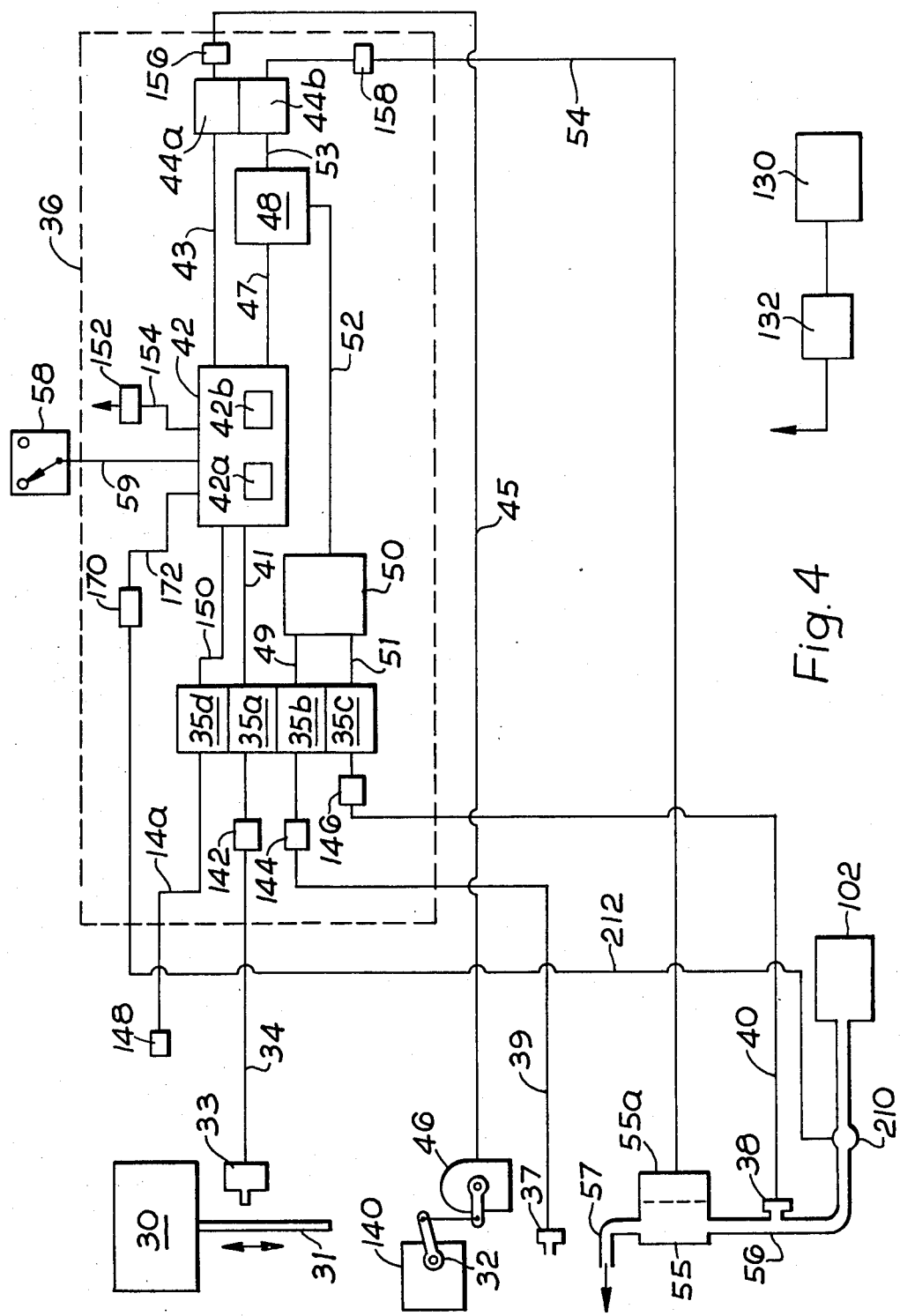
FIG. 4 is a schematic view of a further embodiment of fuel control system according to the invention.

In FIG. 4 a fuel control system is shown which is particularly suitable for use with engines used on locomotives. The fuel control system is used to control the proportions in which liquid fuel and gaseous fuel is supplied to the engine.

The engine is provided with an engine speed governor 30 to which is fed information concerning engine speed and throttle position. The output of the governor may be modified by variations in exhaust gas temperature, engine wheel slip and several other variables. Typically the engine speed governor 30 might be of the type known as the Woodwood PG electro-hydraulic governor.

The governor 30 is provided with an operating link 31 which in conventional engines operating on liquid fuel only is connected to an operating arm 32, which is in turn connected to liquid fuel injection pumps 140 of the engine. The position of the operating arm 32 determines the amount of liquid fuel fed to the engine cylinders via the injection pumps 140, and hence the position of the operating link 31 is functionally linked to the amount of liquid fuel required by the engine.

With the control system of the present invention the operating link 31 is disconnected from the operating arm 32 so that the governor 30 can no longer directly control the amount of liquid fuel fed to the cylinders using the operating link 31.

A position transducer 33 provides a signal indicative of the position of the operating link 31. In this way the signal generated by the position transducer 33 is indicative of the amount of liquid fuel which the governor 30 wishes to deliver to the engine. The position transducer 33 is connected to a filter 35a via a line 34; an analogue to digital converter 142 is provided in the line 34. The filter 35a is connected to an input of a control algorithm 42 via a line 41. The filter 35a forms part of a microprocessor-based controller 36 (shown in dotted lines).

A pressure transducer 37 is disposed in the inlet manifold of the engine to provide a signal indicative of the pressure at the inlet manifold. The pressure transducer 37 is connected to a filter 35b via a line 39; an analogue to digital converter 144 is provided in the line 39 to convert the signal fed to the filter 35b to a digital signal.

A further pressure transducer 38 is disposed upstream of a gaseous fuel flow rate control valve 55, in order to measure the pressure at this point, and provides a signal indicative of the gas pressure in this region. The pressure transducer 38 is connected to a filter 35c via a line 40; an analogue to digital converter 146 is provided in the line 40 to convert the signal fed to the filter 35c to a digital signal.

The pressure transducers 37 and 38 can be replaced by the pressure difference transducer 3 shown in FIG. 1.

A speed transducer 148, which can be of the same type as the speed transducer 1 shown in FIG. 1, measures the engine speed and provides a digital signal indicative of the engine speed. The speed transducer 148 is connected to a filter 35d via a line 149. The filter 35d is connected to another input of the control algorithm 42 via a line 150.

The filters 35b and 35c are connected to a pressure difference calculator 50 via lines 49 and 51 respectively. The output of the pressure difference calculator 50 is connected to first storage means in the form of a look-up table 48 via a line 52. The look-up table 48 is similar to the look-up table 16 shown in FIG. 1.

An on/off switch 58 is connected to a further input of the control algorithm 42 via a line 59. The on/off switch 58 can be a two position rocker switch with an integral lamp to indicate the switch position selected. The on/off switch 58 may be located on a control panel (not shown). The control algorithm 42 is connected to a lamp driver circuit 152 via a line 154, and the lamp driver circuit 152 is connected to a plurality of lamps (not shown). The lamps may also be provided on the control panel.

The control algorithm 42 is connected to a solenoid driver circuit 170 via line 172. The solenoid drive circuit 170 is connected to a solenoid valve 210 via a line 212. The solenoid valve is disposed in a gaseous fuel supply pipe 56.

An output of the control algorithm 42 is connected to a line 43, and the line 43 is connected to a filter 44a. The filter 44a is connected to an injection pump actuator 46 via a line 45. A digital to analogue converter 156 is provided in the line 45 to convert the digital signal outputted from the filter 44a to an analogue signal. The actuator 46 is operatively connected to the operating arm 32, thereby controlling the amount of liquid fuel supplied to the injection pumps 140.

Another output of the control algorithm 42 is connected to the look-up table 48 via line 47. The output of the look-up table 48 is connected to a filter 44b via a line 53. The filters 44a, 44b, 35a, 35b, 35c and 35d are all low pass filters substantially the same as the filters 7a, 7b, 7c and 19 in FIG. 1. The control algorithm 42 and the look-up table 48 together form gaseous fuel flow rate determination means. The control algorithm 42 also includes liquid fuel flow rate determination means.

The filter 44b is connected to a gaseous fuel valve actuator 55a, via a line 54. A digital to analogue converter 158 is provided in the line 54 to convert the digital output signal of the filter 44b to an analogue signal. The gaseous fuel valve actuator 55a is connected to a gaseous fuel flow rate control valve 55 and controls the gaseous fuel flow rate control valve. The gaseous fuel valve actuator 55a and the gaseous fuel flow rate control valve 55 may be the same as the gaseous fuel valve actuator 21a and the gaseous fuel flow rate flow control valve 21 shown in FIG. 1.

The control algorithm 42 includes first storage means and second storage means in the form of look-up tables 42a and 42b respectively.

The operation of the fuel control system shown in FIG. 4 is as follows.

A signal indicative of engine speed is generated by the speed tranducer 148 and transmitted via line 149 to the filter 35d where it is filtered and then transmitted via the line 150 to one of the inputs of the control algorithm 42.

A signal indicative of the position of the governor 30 generated by the position transducer 33 and is transmitted via the line 34 to the filter 35a. The signal transmitted to the filter 35a is converted to a digital signal by the analogue to digital converter 142. The filtered signal from the filter 35a is transmitted via the line 41 to another of the inputs of the control algorithm 42.

The pressure transducers 37 and 38 each generate a signal indicative of the measured pressure and transmit these signals on lines 39 and 40 respectively to filters 35b and 35c respectively. Each signal is converted to a digital signal by the analogue to digital converters 144 and 146. The filtered signals are transmitted from the filters 35b and 35c via lines 49 and 51 respectively, to the pressure difference calculator 50. The pressure difference calculator 50 generates a signal indicative of the difference in the signals on the lines 49 and 51 and transmits the signal to the look-up table 48 via the line 52. In engines which are not supercharged or turbocharged it may be sufficient to provide a single pressure transducer upstream of the gaseous fuel flow control valve, since it can be assumed that the pressure downstream of the valve is at atmospheric pressure.

The control algorithm 42 operates as follows. The control algorithm 42 begins operation when the engine is switched on by initiating all the program variables. The microprocessor-based controller 36 is provided with a watchdog circuit which is regularly pulsed during operation of the engine.

The control algorithm 42 determines from the signal on line 59 which switch position has been selected on the switch 58. One of the switch positions corresponds to a dual fuel mode where the engine is fuelled by both gaseous and liquid fuel, and the other switch position corresponds to a single fuel mode where the engine is fuelled by liquid fuel alone.

If the switch 58 is in the single fuel position then the control algorithm 42 converts the signal from the position transducer 33 into a liquid fuel injection pump actuator signal which is transmitted along the line 43 to the filter 44a. The filtered signal is transmitted along the line 45 where is it converted to an analogue signal by the digital to analogue converter 156, and is then transmitted to the actuator 46 which actuates the diesel injection pumps 140. The liquid fuel injection pump actuator signal is directly proportional to the position of the operating link 31, so that the quantity of liquid fuel which the actuator 46 permits the pumps 140 to inject is the same as the quantity of liquid fuel which the link 31 would permit the pumps to inject if it were not disconnected. When the switch is set to the single fuel mode the control algorithm 42 transmits a signal via line 172 to the solenoid drive circuit 170 which actuates solenoid valve 210 to turn off the gas flow through pipe 56 from the supply 102.

When the switch 58 is in the dual fuel position then the control algorithm 42 uses the signal indicative of the position of the governor 30 to determine the desired gaseous fuel flow rate using the look-up table 42b. The control algorithm 42 uses the signal indicative of engine speed to determine a liquid fuel injection pump actuator drive signal using the look-up table 42a. A signal is transmitted on the line 172 to the solenoid drive circuit 170 to ensure that the solenoid valve 210 is open in order to permit gaseous fuel flow, although the actual gaseous fuel flow rate is not controlled by the solenoid valve 210.

The look-up table 42b contains empirical data relating the desired gaseous fuel flow rate to the position of the governor 30. The look-up table 42a contains empirical data relating engine speed to the desired liquid fuel flow rate and the magnitude of signal required by the injection pump actuation means to produce the desired liquid fuel flow rate.

The liquid fuel injection pump actuator drive signal is transmitted, as described above, via the line 43 to the actuator 46 which actuates the injection pumps 140 to deliver the required amount of liquid fuel to the engine.

The desired gaseous fuel is transmitted via the line 47 to the look-up table 48 which uses the signals on lines 47 and 52 to generate a signal indicative of the desired gaseous fuel flow rate which is transmitted on the line 53 to the filter 44b. The filtered signal is transmitted on the line 54 to the actuator 55a. The signal is converted to an analogue signal by the digital to analogue converter 158. The gas valve actuator 55a actuates the valve 55 to control the gaseous fuel flow rate through the pipe 56 to the engine.

The fuel control system according to the invention may be incorporated on the engine during the construction of the vehicle. It may also be added to vehicles after this construction.

I claim:

1. A fuel control system for an internal combustion engine fueled by a gaseous and a liquid fuel, comprising
    gaseous fuel flow rate control means including flow rate determination means responsive to engine load variables including a signal generated by a transducer indicating such variables,
    said control means including valve means actuable to vary the gaseous fuel flow rate, said valve means being actuated responsive to the signal generated by the gaseous fuel flow rate determination means,
    liquid fuel control rate determination means including injection pump control means controlling the flow rate of liquid fuel pumped into the engine,
    a transducer responsive to pressure difference across said valve means generating a signal indicating the pressure difference,
    said flow rate determination means including information storage means relating the pressure difference across said valve means, the desired gaseous fuel flow rate and the magnitude of the signal required by the valve means to provide the desired gaseous fuel flow rate,
    a control algorithm in connection with said gaseous flow rate determination means and liquid fuel flow rate determination means determining the desired liquid and gaseous fuel flow rate,
    a second information storage means containing information relating to engine speed, desired fuel flow rate and the magnitude of the signal required by the injection pump to produce the required liquid fuel flow rate,
    said control algorithm responsive to any given engine speed derives from said second storage means the signal indicative of the liquid fuel flow rate which it feeds to said injection pump actuation means,
    a third storage means containing information relating position of a liquid fuel governor and a desired gaseous fuel flow rate,
    said control algorithm determining the desired gaseous fuel flow rate given the position of the liquid fuel governor using the third storage means which is influenced by at least one engine variable of speed and
    including switch means for use of liquid fuel only and in the alternate permitting use of liquid and gas fuel.

2. The structure of claim 1, wherein
    said first, second and third storage means comprise a programmable read only memory.

3. The structure of claim 1, wherein
    said gaseous fluid flow rate determination means comprises a microprocessor.

4. A fuel control system according to claim 1 in which the gaseous fuel flow rate control means includes gaseous fuel flow rate determination means, said gaseous fuel flow rate determination means being responsive to engine variables to determine from said variables a desired gaseous fuel flow rate, and being adapted to generate a signal indicative of said desired gaseous fuel flow rate.

5. A fuel control system according to claim 2 in which said gaseous fuel flow rate determination means comprises a microprocessor.

6. A fuel control system according to claim 2 wherein the gaseous fuel flow rate control means includes valve means actuatable to vary the gaseous fuel flow rate, said valve means being actuated in response to the signal generated by the gaseous fuel flow rate determination means.

7. A fuel control system according to claim 6 wherein a transducer responsive to pressure difference across the valve means is adapted to generate a signal indicative of said pressure difference.

8. A fuel control system according to claim 7 wherein the gaseous fuel flow rate control means includes first storage means for storing information relating the pressure difference across the valve means, desired gaseous fuel flow rate, and the magnitude of the signal required by the valve means to produce the desired gaseous fuel flow rate.

9. A fuel control system according to claim 4 in which the liquid fuel flow control means includes injection pump control means for controlling the flow rate of liquid fuel injected to the engine.

10. A fuel control system according to claim 9 wherein stop means is provided for preventing the injection pump control means from injecting more than a predetermined percentage of the liquid fuel which would be injected at full throttle.

11. A fuel control system according to claim 4 in which the gaseous fuel flow rate determination means includes a control algorithm adapted to determine the desired gaseous fuel flow rate.

12. A fuel control system according to claim 11 in which the control algorithm is adapted to control the gaseous fuel flow rate in proportion to an engine speed when a throttle demand is greater than the engine speed.

13. A fuel control system according to claim 11 wherein the control algorithm is adapted to use the difference between an engine speed and a throttle demand as a signal for a proportional and derivative control loop, when the throttle demand is less than or equal to the engine speed, in order to determine the desired gaseous fuel flow rate.

14. A fuel control system according to claim 9 wherein the injection pump control means comprises an injection pump actuator operatively linked to the injection pumps.

15. A fuel control system according to claim 14 further comprising liquid fuel flow rate determination means responsive to at least one engine variable to determine from the or each variable a desired liquid fuel flow rate, and being adapted to generate a signal indicative of said desired liquid fuel flow rate.

16. A fuel control system according to claim 15 wherein the gaseous fuel flow rate determination means and the liquid fuel flow rate determination means include a control algorithm adapted to determine the desired gaseous fuel and liquid fuel flow rates.

17. A fuel control system according to claim 16 in which the liquid fuel flow rate determination means includes second storage means containing information relating engine speed, the desired liquid fuel flow rate, and the magnitude of signal required by the injection pump actuates to produce the desired liquid fuel flow rate.

18. A fuel control system according to claim 16 wherein the gaseous fuel flow rate determination means includes third storage means containing information relating the position of a liquid fuel flow rate governor to the desired gaseous fuel flow rate.

* * * * *